United States Patent [19]

Emmons et al.

[11] 4,261,872

[45] * Apr. 14, 1981

[54] AUTOXIDIZABLE COMPOSITIONS

[75] Inventors: William D. Emmons, Huntingdon Valley; Kayson Nyi, Sellersville, both of Pa.

[73] Assignee: Rohm and Haas Company, Philadelphia, Pa.

[*] Notice: The portion of the term of this patent subsequent to Jun. 27, 1995, has been disclaimed.

[21] Appl. No.: 908,427

[22] Filed: May 22, 1978

Related U.S. Application Data

[63] Continuation-in-part of Ser. No. 782,129, Mar. 28, 1977, Pat. No. 4,145,503.

[51] Int. Cl.$^3$ .................... C08L 91/00; C08F 36/00; C08K 5/16; C08L 75/00

[52] U.S. Cl. ...................... 260/22 CB; 260/18 R; 260/22 CQ; 260/23 AR; 260/23 H; 260/23 XA; 260/23 EM; 260/23 P; 260/23.7 H; 260/23.7 A; 260/45.9 L; 260/29.6 RB; 260/29.7 UA; 525/4; 525/10; 525/14; 525/15; 525/25; 525/34; 525/59; 525/259; 525/290; 525/520; 525/531; 525/921; 526/282; 526/283

[58] Field of Search ....... 260/23 AR, 22 CB, 23 EM, 260/23 XA, 23 H, 23.7 H, 23.7 A, 29.6 RB, 29.7 UA, 45.9 L, 857 UN, 859 R, 862, 873, 878 R, 879, 884, 885, 23 P; 525/10, 25, 34, 259, 290, 531, 920, 921, 59; 526/283, 282

[56] References Cited

U.S. PATENT DOCUMENTS

| | | | |
|---|---|---|---|
| 4,097,677 | 6/1978 | Emmons et al. | 204/159.22 |
| 4,141,868 | 2/1979 | Emmons et al. | 526/283 |

*Primary Examiner*—Joseph L. Schofer
*Assistant Examiner*—Herbert J. Lilling
*Attorney, Agent, or Firm*—Lester E. Johnson

[57] ABSTRACT

The invention is concerned with novel autoxidizable compositions comprising an unsaturated acid ester of a glycol monodicyclopentenyl ether, a condensation or vinyl addition polymer, a siccative and a volatile stabilizer, which compositions are uniquely adapted to be formulated with high solids and practical viscosity ranges for coating and/or impregnating purposes.

28 Claims, No Drawings

AUTOXIDIZABLE COMPOSITIONS

This application is a continuation-in-part of our copending application U.S. Ser. No. 782,129 filed Mar. 28, 1977, now U.S. Pat. No. 4,145,503 issued Mar. 20, 1979. U.S. Ser. No. 703,348, filed July 7, 1976, now U.S. Pat. No. 4,097,677 issued June 27, 1978 is related to our copending application Ser. No. 782,129 supra. and to the present application as a parent to them, all three applications being in the hands of a common assignee. Our copending application Ser. No. 806,572, filed June 14, 1977, now U.S. Pat. No. 4,141,868 issued Feb. 27, 1979, also in the hands of the same assignee, is derived from, and is a continuation-in-part of the same parent applicaton Ser. No. 703,348 supra.

DESCRIPTION OF THE INVENTION

Heretofore, dicyclopentenyl acrylate and/or methacrylate has been proposed for use as a modifier in autoxidizable coating compositions, particularly in such compositions containing certain types of alkyd resins. See for example copending U.S. application Ser. No. 665,017, filed Mar. 8, 1976, now U.S. Pat. No. 4,071,489 issued Jan. 31, 1978. These two monomers used separately or as a mixture thereof, have been generically referred to by the designation DCP(M)A, the individual monomers being specifically designated DCPA for the acrylate and DCPMA for the methacrylate in the patent application referred to.

While the DCP(M)A mentioned has been found quite useful in the application mentioned, nevertheless, DCP(M)A, in spite of low volatility, has an odor that is quite characteristic, pervasive, persistent, and objectionable under certain conditions when put into use by certain operative personnel. Secondly, DCP(M)A is too volatile for baking finishes wherever a faster cure may be desired or necessary for practical operation. Furthermore, use of DCP(M)A in coating, impregnating, and/or molding compositions tends to produce extremely hard and brittle products which may require plasticizers and in some cases show poor weather-resistance.

In accordance with the present invention, an improved autoxidizable composition suitable for coating and/or impregnating purposes is provided which comprises four essential components, (a) a liquid reactive monomer selected from the unsaturated acid esters, preferably the acrylate or methacrylate, of a glycol monodicyclopentenyl ether of formula I hereinafter, (b) a drying oil or a film-forming vinyl addition or condensation polymer, (c) a drier or siccative, and (d) a volatile stabilizer.

The first component (a) is a monomeric compound of the class defined by the general formula:

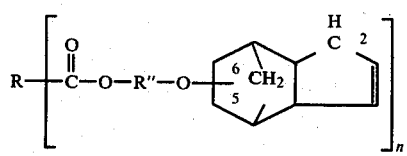

wherein n is 1 or 2, and wherein R, when n is 1, represents (1) the unsaturated hydrocarbon residue of a monocarboxylic unsaturated acid, e.g., of acrylic, methacrylic, and crotonic acid or (2), when n is 2, the unsaturated hydrocarbon residue of a dicarboxylic acid, e.g., of itaconic, fumaric, maleic, or alpha-methylene glutaric acid, and R'' represents an alkylene group having 2 to 12, preferably 2 to 6, carbon atoms or an oxaalkylene group having 4 to 12 carbon atoms and having one or more oxygen atoms joining distinct segments of the alkylene groups, each such segment having at least two carbon atoms. R'', in preferred embodiments, represents the hydrocarbon residue of a ($C_2$ to $C_6$)-diol or of a ($C_2$ to $C_6$)-glycol containing one or two oxygen atoms joining two or three carbon atom segments of the alkylene groups. The ester-ether chain may be connected to either the 5-position or 6-position of the ring nucleus as indicated in the general formula. In fact, the product may comprise a mixture of the two compounds in which part of the ester-ether chain is substituted in the 5-position and part is in the 6-position.

The preferred compounds are those in which the ester is derived from acrylic acid or methacrylic acid and the R in formula I is $H_2C=C(R^1)-$ wherein $R^1$ is H or $CH_3$. Hereinafter, the term (meth)acrylate is sometimes used as a generic term to embrace both the specific acrylate and specific methacrylate; the term (meth)acrylic acid is also sometimes used to embrace both of these individual acids. While the claims herein specifically call for the acrylate or methacrylate, nevertheless, applicants intend to cover the other unsaturated acids mentioned above under the doctrine of equivalents.

The monomers of formula I may be prepared by first reacting dicyclopentadiene with excess diol, using an acid catalyst to produce an intermediate ether (hydroxy-R''-O-dicyclopentadiene) and then esterifying the hydroxyl of the intermediate with the unsaturated acid, e.g., acrylic acid, using an acid catalyst.

Suitable acid catalysts for producing the ether include sulfuric acid, p-toluenesulfonic acid, and boron trifluoride. Examples of ($C_2$–$C_6$) diols or glycols that may be used include ethylene glycol, propylene glycol, neopentyl glycol, 1,3-butylene glycol, 1,6-hexanediol, diethylene glycol, dipropylene glycol, etc. The monohydroxy-glycol ether obtained in the first step of the reaction may be, and preferably is, isolated by distillation from less volatile by-products such as bis-dicyclopentenyl ether and low polymers of dicyclopentadiene.

The mono-ether obtained from the first step may then be esterified with the unsaturated acid in the presence of an acid catalyst. Alternatively, the second step may be an acylation (with acid chloride or anhydride) or a transesterification of a simple ester of the acid, such as methyl methacrylate, ethyl acrylate, and so on, with the mono-ether (e.g., that obtained in the first step) in the presence of a neutral or basic catalyst.

The compounds, especially the (meth)acrylates of formula I are liquid under normal ambient conditions of temperature and pressure. These (meth)acrylates are of analogous character, in polymerizability and autoxidizability, to that of DCP(M)A but are characterized by such low volatility that, unlike DCP(M)A, they are for all practical purposes, virtually free of odor. Even on baking up to temperatures as high as 150° C., they do not produce an objectionably odoriferous volatile component before cure is complete. In addition, these new compounds yield a softer product than DCP(M)A so that the need for a plasticizer is greatly reduced or eliminated. For example, these monomeric compounds offer a range of flexibility and hardness so that they can be used, if desired, with alkyd phthalic-anhydride type coatings without a plasticizer.

The ester-ether monomers of formula I are dually reactive extremely high-boiling liquids which have been found to have an unusual combination of desirable characteristics for use in coatings: - low viscosity, extremely low volatility, and low toxicity; hydrophobicity and outstanding hydrolytic stability even under acid or alkaline conditions; an outstanding compatibility with a wide range of polymeric and/or resin-forming condensates so that they can be used with or without a small amount of another solvent to form a solution of a film-forming polymer of the types mentioned above, such as a polyester having maleate-fumarate type of unsaturation and/or drying oil unsaturation, such as an oil-modified alkyd, optionally with another polymer and/or resin-forming condensate, which can be applied as a coating to any substrate; a reactivity with a wide variety of film-forming polymers of the types mentioned above, such as an unsaturated alkyd, especially with an oil-modified alkyd, optionally in conjunction with other non-volatile polymeric and/or resin-forming materials, in the presence of a metal-containing siccative or drier whereby the exposure of a coating containing the reactive monomer, the oil-modified alkyd, (optionally also another polymer and/or condensate), and a siccative, with or without other solid ingredients, e.g., pigments, fillers, plasticizers, dyes, etc., to normal atmospheric conditions results in the production of solid films having a desirable combination of characteristics. In the case of 100% solids compositions containing no solvent other than the non-volatile reactive monomer solvent, air-drying to solid state is accomplished without the necessity of volatilizing any solvent material, thereby reducing air pollution and wastage.

The second component (b) of the autoxidizable compositions of the invention may be a drying oil per se, such as linseed oil, safflower oil, soybean oil, tung oil, dehydrated castor oil, oiticica oil, menhaden oil or the like, or mixtures of such oils. These oils have inherent autoxidizable functionality that operates in the presence of a siccative.

As the second component of the autoxidizable compositions there may also be used film-forming polymers having autoxidative functionality. Examples of such film-forming polymers useful as the second component are:

(a) Alkyd resins of certain unsaturated types having autoxidative functionality;

(b) Film-forming condensation polymers modified with acrylate or methacrylate functionality as end groups or pendant groups, e.g.,
 (1) Isocyanate prepolymers having no free NCO groups, e.g., those from polyethers or polyesters and an organic polyisocyanate coupled with a hydroxyalkyl acrylate or methacrylate,
 (2) Acrylic acid or methacrylic acid esters of hydroxy-terminated polyethers or polyesters,
 (3) Resin-forming diepoxides (epoxy resins) having acrylic acid or methacrylic acid added across the epoxy double bonds,
 (4) The acrylate (or methacrylate) functional polyesters formed from epoxidized oils (e.g., soybean oil) and acrylic or methacrylic acid.

(c) Film-forming vinyl addition polymers with olefin unsaturation having autoxidizable characteristics, i.e., those having such autoxidizable functionality in the backbone or as a pendant group, e.g.,
 (1) Vinyl polymers having allylic functionality, herein defined generically as

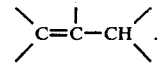

Specific examples include copolymers of DCP(M)A, allyl acrylate or allyl methacrylate, generically represented as allyl (meth)acrylate, butadiene, or allyl Cellosolve (meth)acrylate; also the soluble, fusible, uncrosslinked vinyl addition polymers and copolymers of a monomer of formula I.
 (2) Vinyl polymers with pendant drying oil functionality, such as those disclosed in Kottke U.S. Pat. No. 3,759,915, Hopwood et al, U.S. Pat. No. 3,590,016, and R. W. Novak and B. B. Kine application Ser. No. 751,507 filed Dec. 17, 1976 now abandoned, and entitled "Water-Soluble Air-Oxidizing Acrylic Coatings".

Besides the type of polymers just mentioned for use as the second component of the autoxidizable compositions of the present invention, there may be used other vinyl resins which in themselves lack any appreciable inherent autoxidizable functionality. The latter type of polymer may have a molecular weight falling in a wide range from as low as about 20,000 to as high as 350,000 whereas the first-mentioned type is generally of low molecular weight in the range of about 500 to 15,000 or so.

The third component (c), of the compositions is a drier or siccative or mixture thereof. This component may be any polyvalent metal-containing complex or salt that catalyzes the oxidative curing of drying oils or drying oil-modified alkyd resin. Examples of the driers are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$-$C_{30}$) aliphatic acids. Examples of the polyvalent metal include calcium, copper, zinc, manganese, lead, cobalt, iron, and zirconium. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate. Mixtures of various driers mentioned in "Encyclopedia of Chemical Technology", Kirk-Othmer, Volume 5, pages 195–205, published by Interscience Encyclopedia, Inc., N.Y. (1950) may be used.

The fourth component (d) of the compositions of this invention is a volatile stabilizer or inhibitor, such as a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the blends of components (a), (b) and (c) is desired.

The proportion of the drier may be quite low and is generally used in the amount of 0.0005 to 2% metal content by weight of (a)+(b). The drier may be added to the composition prior to storage provided such addition is made in the absence of oxygen or a volatile stabilizer (d) is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of components (a)+(b).

In general, the present invention provides autoxidative compositions of exceptional versatility and efficiency of autoxidative cure. The acrylic acid ester and methacrylic acid ester of the glycol mono-dicyclopentenyl ethers as defined in formula I are uniquely adapted to be used for making coating and impregnating compositions which can have a high solids content and still retain practical viscosities for application by various coating methods. The reactive monomer of formula I serves as a diluent to dissolve or disperse the film-forming component (b) and also to provide a part of the final cured product that influences the physical properties of the cured composition. The extremely low volatility of the formula I (meth)acrylate reduces or eliminates the obnoxious odors and possibly hazardous vapors from the standpoints of inhalation by operators and liability to ignite and explode. The extremely low volatility of the formula I acrylates and methacrylates makes it possible to accelerate curing by baking at relatively higher temperatures than reactive monomers that have heretofore been used in earlier practice without encountering serious ecological hazards. The (meth)acrylate formula I monomers in the compositions of the present invention containing a siccative and a volatile stabilizer, when applied for coating or impregnation in the usual ambient conditions so that the film thereof is exposed to the oxygen of the surrounding atmosphere and the stabilizer evaporates, undergoes autoxidation at the point of unsaturation in the ring and subsequent vinyl polymerization of the (meth)acrylate double bond. The latter polymerization occurs in spite of the exposure to oxygen which normally inhibits such polymerization. When component (b) of the compositions is capable of efficient autoxidation by virtue of its chemical structure, the combination of the two components (a) and (b) results in a tight crosslinking cure apparently involving extensive chemical interbonding as well as physical intermeshing between the (a) and (b) components. However, even if component (b) itself has little or no susceptibility to autoxidation in the presence of oxygen and a siccative by virtue of its chemical structure, when the composition is applied and the stabilizer evaporates, the autoxidation process involving the action of the siccative and oxygen on the formula I monomeric (meth)acrylate generates a free radical flux which causes subsequent vinyl polymerization of component (a) and also of any part of component (b) which still contains any remaining vinyl type of unsaturation. The result is again a tight intermeshing of the cured components (a) and (b), possibly less chemical bonding than in the former instance.

Compositions of the invention containing component (a) and either type of component (b) can be prepared with a siccative and a volatile stabilizer and stored in closed containers thereby providing a single-package product having a reasonably long pot-life and shelf-life. Pigments, fillers, dispersants, dyes, or other materials may be included in the composition before storage or shipment to the point of application.

In the following description, the four-component compositions are discussed under headings that apply to a particular type of component (b), it being understood that each of such compositions may be modified, if desired, by inclusion of pigments, dyes, dispersants, and other ingredients commonly employed to adapt the composition to a particular use. Since the alkyd resin (item (a) of the list of autoxidizable film-forming polymers) is an important type of polymer for use in the compositions of the invention, it is discussed first and serves as a general pattern for the compositions containing the other materials as the entire component (b) or as part thereof.

(a) Alkyd Resin

Any alkyd resin having unsaturation derivable from the use of (1) an alpha,beta-ethylenically unsaturated dicarboxylic acid, such as fumaric or maleic acid, as part or all of the polycarboxylic acid component of the alkyd resin and/or (2) an unsaturated fatty acid or unsaturated oil having drying or semi-drying characteristics may be used. Examples of aromatic polycarboxylic acids that may be used in preparing the polyester or alkyd are o-phthalic acid or anhydride, terephthalic acid, isophthalic acid. Aliphatic dicarboxylic acids may be used having at least four carbon atoms and up to 36 to 40 or more carbon atoms. The dibasic acids are preferably those in which carboxylic groups are separated by unsubstituted saturated or unsaturated aliphatic hydrocarbon groups although such groups may be substituted by hydroxyl groups as in malic acid or even halogen atoms, e.g., chlorine. Examples of the aliphatic dicarboxylic acids (useful in either acid or anhydride form) that may be used in forming the unsaturated alkyds including the aforementioned oil-modified alkyds include adipic, maleic, fumaric, pimelic, suberic, azelaic, and sebacic acid. Also useful are the various commercially available grades of dimer acid obtained by polymerizing linoleic acid as described in U.S. Pat. No. 2,482,761 and J. Am. Oil Chemists Association 24, 65 (1947). The composition of one such dimer acid (sold under the designation Emery 955 dimer acid) is described in H. F. Payne, "Organic Coating Technology," Vol. I, pp. 275-7, John Wiley & Sons, Inc. N.Y., 1954, and apparently contains a small proportion of trimers having three carboxyl groups. The pertinent disclosure of these three references is incorporated herein by reference. The polyols used in making the alkyd may have two to six hydroxyl groups and from two to eight carbons and include ethylene glycol, diethylene glycol, glycerol, propylene glycol, erythritol, pentaerythritol.

Typical drying oils that may be employed as the oil-modifying component of an oil-modified alkyd are mono-, di-, and tri-glycerides of higher fatty acids having a relatively high degree of unsaturation such as linseed oil, safflower oil, tung oil, soybean oil, dehydrated castor oil, oiticica oil, menhaden oil, etc. The alkyd may comprise combinded therein one or more of such drying oils whether of triglyceride, mono-glyceride, di-glyceride type or the corresponding carboxylic acid or anhydride. Use of the term "drying" oil is intended herein to embrace those oils, whether of natural or artificial origin, that are characterized by reaction with oxygen to form cured solid products. It is intended to embrace in this term those so-called "semi-drying" oils which, because of a lesser degree of unsaturation, are not as rapid in curing in this fashion as the most typical drying oils that are on this account most commonly used in the paint and varnish industries. Thus, the oil-modified alkyds with which the invention is concerned are those in which at least a part of the oil-modification is composed of a drying (or semi-drying) oil. There is no intention to spell out any limitation as to the methods by which the unsaturated alkyd including the oil-modified alkyd resin is produced since the method of making this particular component, if used in the composition, is well-known. The alkyds employed may be long-, medium-, or short-oil products. Generally the short-oil alkyds have about 42 to 50% oil to 45 to 39% of the diacid used in making the alkyd; the medium-oil alkyds contain 53 to 61% oil to 36 to 30% of the diacid and the long-oil alkyd contains about 64 to 70% oil to 28 to 23% diacid. Preferably, the medium-oil-modified alkyds and the long-oil-modified alkyds are employed in the compositions of the present invention. Such oil-modified resins are generally adaptable to air-drying whereas the short-oil-modified alkyds generally require baking to accomplish their curing.

The essential binder-forming components of an alkyd coating composition in accordance with the present invention are:

(a) Reactive non-volatile monomer comprising at least one compound of formula I, (b) An alkyd resin having at least one unsaturated component selected from (1) maleic acid or anhydride or fumaric acid type residues or moieties and (2) drying oil type residues or moieties.

The relative proportions between the several essential components mentioned may be as follows. The amount of reactive monomer component (a) may range from about 5% to about 75% of the total amount of components (a) and (b). However, preferred compositions contain component (a) in an amount of about 25% to 60% by weight of (a)+(b).

The reactive non-volatile monomer component (a) may consist of one monomer of formula I or of a mixture of two or more of the ester-ether monomers of formula I or it may comprise a mixture of at least one monomer of formula I with one or more other non-volatile liquid reactive monomers selected from:

(1) ($C_8$–$C_{20}$)alkyl or ($C_8$–$C_{20}$)alkenyl (meth)acrylates, (2) Di-($C_4$–$C_{20}$)alkyl fumarates, maleates, and itaconates, those in which the alkyl groups each have from 4 to 8 carbon atoms being preferred, (3) Vinyl esters of higher ($C_8$–$C_{20}$)saturated or unsaturated aliphatic acids, (4) Dicyclopentenyl acrylate and methacrylate, and (5) A polyethylenically unsaturated monomer of low volatility having at least two groups of the formula $H_2C=C<$.

The reactive monomers of the five classes just mentioned, serve to modify the properties of the final cured coatings whether air-dried or baked. Thus, the monomers of the first three groups listed can be used to vary the coating films in respect of flexibility and toughness; Class (4) monomers can be used to harden the final cured films, and the fifth class can impart greater water-resistance, solvent-resistance, abrasion resistance, and blocking resistance. Thus, the final properties in the cured films may be varied in a predetermined way by adjusting the composition of reactive monomer (a) in the alkyd coating and/or impregnating composition. In general, when a reactive monomer of formula I is blended with one or more other non-volatile reactive monomers of the five categories listed, the relative proportions between the monomer of formula I, and the other monomer of the list above may vary widely, so that the formula I monomer material may constitute from about 20% to 100% by weight of the total reactive monomer component (a). Preferably, it constitutes at least 50% to 80% by weight thereof except in the case of a mixture of formula I monomer and a monomer of class (5) in the list; the amount of the latter monomer should never exceed 25% by weight of the total of (a) and (b) binder weight, and preferably is not over 15% by weight of the total of (a) and (b).

Examples of reactive monomer in (1) of the list of other monomers are decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)acrylate, linolenyl (meth)acrylate. Examples falling within category (2) include dibutyl fumarate, dibutyl itaconate, dibutyl maleate, di(2-ethylhexyl) fumarate, di(dodecyl) maleate, and distearyl itaconate. Examples in category (3) include vinyl stearate, vinyl laurate, and vinyl oleate. Examples in category (5) include glycol or polyol (meth)-acrylates, e.g., ethylene glycol di(meth)acrylates, trimethylolpropane tri(meth)acrylate, neopentyl glycol di(meth)acrylate; 1,6-hexanediol di(meth)acrylate; pentaerythritol tri- and tetra-(meth)acrylate; 1,3- and 1,4-butanediol di(meth)acrylate.

Besides the essential binder components in the alkyd coating compositions mentioned above, the composition may also comprise a volatile solvent in an amount of up to about 30% by weight, but preferably not over 20% by weight, of the entire weight of formulated coating composition ready for application, and, unless a clear coating film is desired, it may comprise a pigment and/or filler, a dispersing agent therefor, and/or other materials conventionally used in paints, varnishes and the like coating compositions.

Besides the essential components mentioned hereinabove, there may also be included various addition or codensation polymers of thermoplastic type, to the extent that they are compatible with component (a) in the presence of component (b) with or without a small amount of organic solvent. Instead of thermoplastic addition polymers, thermosetting condensates, such as an aminoplast, or phenoplast, may be included again to the extent they are compatible. Generally the amounts of such additional polymers and/or condensation products may be from about ½ to 25% by weight based on the total weight of (a)+(b).

The binder of the compositions outlined above consists essentially of the components (a) and (b) (and any addition and/or condensation polymers just mentioned in the preceding paragraph, if included) and the vehicle consists of these components and the solvent if included. Taking these components into consideration, the preferred relative proportions between them may be as follows:

For each 100 parts by weight of component (b), the amount of monomeric component (a) may be from about 15 to 300 parts by weight, preferably about 25 to 150 parts by weight.

In preferred coating compositions, reliance may primarily be placed upon the component (a) to provide the desired viscosity for application of the coating composition (e.g., by dipping, brushing, spraying, roll-coating, and the like) so that little or no volatile solvent is used in preparation of the coating composition, thereby providing 70% to 100% solids compositions in the sense that the entire binder/vehicle of the composition is cured to produce the solid coating without the necessity to remove an appreciable amount of a volatile organic solvent therefrom during the curing. By avoiding volatile organic solvent materials, the hazards of fire and toxicity to operators, and the need for solvent recovery systems is avoided.

It is one part or aspect of the present invention to provide a more useful liquid of reactive and essentially non-volatile and non-odoriferous character that can be used as the entire vehicle of autoxidative coating compositions comprising pigments, fillers and film-forming liquid or solid binder materials suitable as component (b) of the autoxidative compositions herein, such as drying oils and polyesters (including alkyd and oil-modified alkyd resins) and the like which can be oxidatively cured and chemically combined with the reactive monomer component of the vehicle when the films thereof containing a siccative obtained on coating are dried at ambient or higher temperatures. This non-volatile reactive liquid consists of a monomer of formula I hereinabove or comprises a mixture of such a monomer with at least one other monomer selected from the five categories listed hereinbefore. Such a mixture of non-volatile monomers may constitute the entire vehicle or it may be the predominant component of a vehicle which includes some volatile non-reactive solvent in minor proportion.

The non-volatile reactive mixed liquid vehicle just defined may be prepared by mixing and sold by the producer as a mixture ready for use as a formulating ingredient to serve as the entire, or an important part of, the vehicle in making coating compositions by users to whom the mixture is shipped. Besides preparing the non-volatile reactive diluent or solvent mixture in the relative proportions of 51 to 99%, preferably 60 to 90%, by weight of monomer of formula I and 49 to 1%, preferably 40 to 10%, by weight of the other non-volatile monomer component, the formula I monomer may be supplied as two or more mixtures having various proportions of formula I monomer therein including a mixture containing as low as 1% by weight thereof and 99% of the other non-volative reactive component and a mixture as high as 99% formula I monomer. The coating formulator can then mix the two liquids to provide whatever relative proportion is needed for the particular coating composition he is concerned with. For example, the relative porportion of formula I monomer in the non-volatile vehicular medium he uses will depend on the hardness and toughness he seeks and the contribution thereto obtained by the other components of the composition, including especially the particular binder, e.g., alkyd as discussed herein.

(b) (1) Urethane-oil, Polyurea, or Polyurethane Condensate Containing No Free NCO Groups Examples of these condensates which contain no free isocyanate (NCO) groups that can be used as component (b) include those uralkyds and urethane oils which contain drying oil functionality. Suitable examples are described in J. H. Saunders and K. C. Frisch, *Polyurethanes: Chemistry and Technology*, Part II, Interscience Publishers, (N.Y., 1964), such as in Chapter X Coatings, pp. 453 ff thereof. Other suitable examples of urethane polymers that can be used as component (b) include those prepolymers of polyisocyanates with polyhydroxy or polyamino compounds in which all of the remaining free NCO groups have been reacted with a hydroxyalkyl acrylate, such as hydroxyethyl (meth) acrylate.

The latter type of these products may be referred to as (meth)acrylated polyurethane or polyurea condensates. Examples of polyols that may be used to make polyesters, polyethers, polyether amides or polyester amides, that can be reacted with diisocyanates and subsequently (meth)-acrylated include trimethylol methane, erythritol, pentaerythritol, and the diols, ethylene glycol, propylene glycol, trimethylene glycol, diethylene glycol, pentamethylene glycol, hexamethylene glycol, decamethylene glycol, dodecamethylene glycol, pentaglycol, and 1,12-octadecanediol.

Examples of polycarboxylic acids that may be used with the polyols above to make the polyesters are malonic, succinic, glutaric, adipic, azelaic, sebacic, phthalic, isophthalic, and hexahydroterephthalic.

Examples of aminoalcohols that may be used to make polyetheramides or polyesteramides include 5-aminopentanol-1,6-amino-5-methylhexanol-1, ethanolamine, 3-aminopropanol, 4-aminobutanol, 6-aminohexanol, and 10-aminodecanol. Examples of diamines include ethylenediamine, hexamethylenediamine and decamethylenediamine.

The production of such polyethers, hydroxy-terminated polyesters, hydroxy-terminated polyesteramides, and the like is known. Generally, these condensates have a molecular weight in the range of about 500 to 12,000 before reaction with a polyisocyanate and subsequent (meth)acrylation of all free NCO groups.

Any suitable polyisocyanate may be used, e.g., hexamethylene diisocyanate, tolylene diisocyanate, and octamethylene diisocyanate.

The reaction of the hydroxy-terminated condensate, e.g., the polyester with the polyisocyanate is known and the subsequent reaction of the free NCO groups with a hydroxyalkyl (meth)acrylate can be carried out in the already known ways.

(b) (2) (Meth)acrylic Acid Esters of Hydroxy-Terminated Polyethers or Polyesters In another embodiment, the alkyd resin condensate may be replaced by the ester obtained by esterification with acrylic acid or methacrylic acid of a hydroxy-terminated polyether condensate or hydroxy-terminated polyester or alkyd derived from saturated polyols and, in the case of the polyesters, saturated polycarboxylic acids.

The same polyols and diacids mentioned under (b) (1) above may be used to make the hydroxy-terminated polyether condensate or the hydroxy-terminated polyester condensate and any alkyd condensate having free hydroxyl functionality and obtained by condensation of saturated polyols and saturated polyesters may be used.

The production of such polyethers, and of the hydroxy-terminated polyesters, by using the hydroxyl functionality in excess of the carboxyl functionality is known. In general the molecular weight of the polyethers or of the polyesters may be in the range of about 500 to 12,000 or possibly even higher.

The free hydroxyl groups of the polyether or of the polyester are esterified with acrylic acid or methacrylic acid or with a mixture thereof in known ways to produce the (meth)acrylated polyether or polyester.

(b) (3) (Meth)Acrylated Epoxy Resins

In this embodiment, the compositions of the present invention comprise as component (b), a resin-forming epoxy resin (diepoxide) to the epoxy groups of which there has been added a molecule of acrylic acid or of methacrylic acid.

(b) (4) (Meth)Acrylated Polyesters of Epoxidized Oils

The compositions according to this invention of this embodiment comprise, as component (b), an epoxidized oil having 10 to 18 carbon atoms in each fatty chain of the glyceride to the epoxy groups of which acrylic acid or methacrylic acid has been added, thereby forming a polyester reaction product.

In this embodiment, the component (b) is derived from any unsaturated glyceride having at least one unsaturated fatty acid chain of 10 to 18 carbon atoms, and preferably having three such chains, with sufficient points of unsaturation to enable the introduction of at least one epoxy group in each chain. Examples of unsaturated glycerides that may be used are: olive oil, soya bean oil, cottonseed oil, palm oil, menhaden oil, linseed oil, and safflower oil. The making of these reaction products is disclosed in U.S. Pat. Nos. 3,125,592; 3,450,613; and 3,878,077.

(c) (1) Film-Forming Vinyl Addition Polymers Having Allylic Unsaturation

In this embodiment, one of the essential components of the binder in the coating and/or impregnating compositions is a film-forming vinyl addition polymer having an "allyl" type of unsaturation which may be in the backbone of or in a terminal or pendant group on the polymer chain. Examples of such polymers are the copolymers of DCP(M)A, of allyl acrylate or methacrylate, of allyl Cellosolve acrylate or methacrylate, or of butadiene.

In addition, the vinyl addition homopolymers and copolymers of a reactive monomer of formula I fall in this category. The linear addition homopolymers and copolymers (with other monoethylenically unsaturated monomers having a single group $H_2C=C<$) are obtained by vinyl addition polymerization attributable to the unsaturation of the R group, as in the case of the unsaturated carbon to carbon bond in these R substituents, e.g., in the acrylate, methacrylate, fumarate diester, maleate diester, and itaconate diester. The relative proportions between (1) the monomer of formula I and (2) the other monomer(s) in the copolymer may range from 1:99 to 99:1 weight ratio and preferably ranges from 20:80 to 80:20. The linear addition homopolymers are readily produced by anionic polymerization catalyst systems, leaving the point of unsaturation in the five-membered ring of formula I intact. The linear addition copolymers are obtained by solution polymerization or by aqueous emulsion polymerization, using a free radical initiator.

This type of film-forming polymer contains, by virtue of the allylic unsaturation, autoxidizable functionality which generates a radical flux in the presence of a siccative and oxygen which assures coreaction and crosslinking of the vinyl polymer with the reactive monomer comprising a compound of formula I.

(f) (2) Film-Forming Vinyl Addition Polymers With Drying Oil Functionality

In this embodiment, component (b) has, attached to the polymer chain, groups or radicals derived from drying oils. Polymers having such pendant functionality groups are known. For example, such polymers are disclosed in Kottke, U.S. Pat. No. 3,759,915, Hopwood et al., U.S. Pat. No. 3,590,016, and the aforesaid Novak and Kine application, Ser. No. 751,507, filed Dec. 17, 1976, and the disclosures of these patents and the aforesaid application are incorporated herein by reference.

The drying oil functionality provides autoxidizable characteristics to the film-former, and thereby in the presence of a siccative and oxygen, coreaction and crosslinking of the vinyl polymer of component (b) with the reactive monomer component (a) is assured.

Vinyl Resins of High Molecular Weight

This embodiment of the invention is concerned with certain vinyl resin coating compositions in which the vinyl resin binder or film-forming component is of high molecular weight and is normally dissolved in an organic solvent which is volatilized after application of the composition to the surface of substrates to be finished. Because the vinyl resin component is generally of high molecular weight, it is normally difficult to obtain a reasonable viscosity in the coating composition without excessive dilution with organic solvent and the necessity to apply a plurality of coats to obtain the desired protective thickness. The present invention has been found to alleviate or reduce this difficulty in the solution coating compositions with which it is concerned, namely thermoplastic vinyl or acrylic polymer solutions, polyvinyl acetals, and chlorinated polyisoprene containing about 64–65% chlorine. In the compositions of the present invention, the vinyl resin is dissolved in an organic liquid vehicle which consists at least in part of a non-volatile reactive monomer including a monomer of formula I, e.g., dicyclopentenyloxyethyl acrylate or methacrylate and to this extent the functional solids of such a coating system are significantly higher than obtained when the vinyl resin is dissolved in conventional volatile solvents.

Commercially available vinyl resin coating compositions of lacquer type, including impregnating versions thereof, based on solutions in organic solvents of thermoplastic vinyl or acrylic polymers, polyvinyl acetals, such as polyvinyl butyral, and chlorinated rubber (polyisoprene) containing 64–65% chlorine generally provide coating or impregnating films which are often of limited hardness and toughness and are seriously lacking in one or more other properties, being especially susceptible to deterioration (yellowing, discoloration, cracking, shrinking and other distortions; decomposition, removal and the like) by wear and abrasion, chemical attack, particularly organic solvents and alkaline materials, weathering forces, such as wind, rain, and radiation including ultraviolet light rays of the sun, other natural radiation including cosmic rays, e.g., x-rays, $\beta$-rays, gamma-rays, as well as radiation emitted by all sorts of artificial means, as in lasers, x-ray machines, and radioactive materials (artificial as well as natural). Coating compositions used to make fluorescent screens in oscilloscopes, television picture tubes, and electron microscopes, are examples of compositions subject to radiation attack.

The coating compositions of the present invention comprise a monomer of formula I or a mixture thereof as the entire non-volatile reactive monomer component or as a major part thereof.

Preferred polymeric materials with which this embodiment is concerned are:

(1) Thermoplastic vinyl addition polymers of one or more monomers consisting of monoethylenically unsaturated monomers having a single unsaturated group of the formula $H_2C=C<$. These solution polymers generally have a molecular weight in the range of 20,000 to 350,000 viscosity average.

(2) Polyvinyl acetals, especially polyvinyl butyral, obtained by reacting a polyvinyl acetate under hydrolytic conditions with an aliphatic ($C_2$ to $C_8$)aldehyde, such as acetaldehyde, butyraldehyde, and so on.

(3) Chlorinated polyisoprene in which there is combined in the polymer, about 64–65% by weight of chlorine. Commonly called chlorinated rubber, it is not a rubber but is a hard, brittle polymer.

All three of these polymer classes are soluble in organic solvents, being within the molecular weight range mentioned in (1) above, and commonly, coating compositions of lacquer type are based on the use of a volatile organic solvent, such as hydrocarbons of aromatic or aliphatic type, e.g., mineral spirits, benzene, toluene, xylene, ketones, such as acetone and methyl isobutyl ketone, ethers, such as ethyl ether and dioxane, halogenated hydrocarbons, such as chloroform, ethylene dichloride, perchloroethylene, and various mixtures of organic solvents.

It has been found that monomers of formula I have remarkable compatibility with this type of polymeric material and can be used to replace a significant amount of the conventional solvents used in making coating compositions based on such polymers if there is also provided in the coating compositions a drier or siccative and a volatile stabilizer to inhibit air-drying of the drier-containing coating composition until it has been applied to the substrate to be coated or impregnated. Incorporation of formula I monomers in these lacquer compositions also facilitates rapid solvent loss, rapid dry, and enhances gloss development, particularly when the resulting coatings are dried at ambient temperature.

In the following examples, illustrative of the invention, that is, the new compositions and their uses, the parts and percentages are by weight and the temperatures are in Centigrade unless otherwise specified.

EXAMPLE 1

(a) Methacrylate Ester of Ethylene Glycol Monodicyclopentenyl Ether (Monomer 1a)

A three-liter, three-necked, round-bottomed flask equipped with a mechanical stirrer, a thermometer, a condenser atop a Dean Stark trap, an air ebulliator, and a heating mantle is charged with 971.5 g. (5 moles) of ethylene glycol monodicyclopentenyl ether, 473.5 g. (5.5 moles) of methacrylic acid, 19.0 g. of p-toluene-sulfonic acid catalyst, 0.75 g. of hydroquinone inhibitor, and 1000 g. of heptane solvent. The mixture is heated at reflux; after 4 hours, 67 g. (74.4%) of water is removed. During the next 6 hours, reflux is continued while 400 ml. of heptane is removed to increase the batch temperature to 115° C.; conversion is 97.8% as measured by water evolution.

The crude product is neutralized with 437 g. (0.825 mole) of 20% aqueous sodium carbonate, diluted with 150 ml. of water, and the lower aqueous phase separated. The product phase is washed with 3×150 ml. of water until the washes are neutral. Heptane is removed in vacuo to afford a quantitative yield of methacrylate ester. Glc analysis shows the product to contain ca. 3–4 % unreacted alcohol. A small portion of the product is purified by vacuum distillation (b.p. 115°–120° C./0.1 mm. Hg) in the presence of phenothiazine inhibitor.

Analysis: % Calculated: C, 73.25; H, 8.45; O, 18.29. % Found: C, 73.48; H, 8.88; O, 18.12.

IR spectral analysis and NMR investigation confirms the product identity.

(b) The ethylene glycol monodicyclopentenyl ether that can be used as the starting material in the esterification described in part (a) of Example 1 can be the product obtainable as follows:

A two-liter, three-necked, round-bottomed flask equipped with a mechanical stirrer, a thermometer and a thermostatic control, an addition funnel, and a heating mantle atop a pot-lifter is charged with 993.1 g. (16 moles) of anhydrous ethylene glycol and 28.4 g. (0.2 mole, 5 mole % on a dicyclopentadiene) of boron trifluoride etherate. The solution is heated to 110° C. and dicyclopentadiene (528.8 g., 4 moles) is added over 5 hours during which the temperature is maintained at 110°–120° C. At the end of the addition, the dark product mixture is held at 115° C. for another 3 hours. Glc analysis shows complete consumption of dicyclopentadiene.

The reaction mixture is cooled to room temperature and 28 ml. (0.336 mole) of concentrated, aqueous ammonia is added gradually, followed by 150 ml. of water. The product is taken up with 750 ml. of heptane and transferred to a separatory funnel. The lower layer containing the ammonia complex of $BF_3$ and unreacted ethylene glycol is drained. The product is washed with 3×150 ml. of water to achieve neutrality in the aqueous phase. Hexane is stripped in vacuo affording 696 g. of crude product; distillation at reduced pressure (b.p. 92°–93° C./0.05 mm. Hg) through a short Vigreux column yields 530 g. (68%) of clear, light yellow liquid which is ca. 99% pure by glc analysis.

(c) Homo-oligomers of Monomer 1a Produced in Part (a)

A 500 ml., three-necked, round-bottomed flask fitted with a mechanical stirrer, a drying tube atop a condenser, a nitrogen inlet, a thermometer, and a heating mantle is charged with 58.3 g. of toluene, 0.88 g. (7.87 mmol) of solid potassium t-butoxide, 5.8 g. (30 mmol) of the ether product of (b), and 52.5 g. (200 mmol), of methacrylate ester product of part (a) of this Example 1 (hereinafter referred to as Monomer (1a). The reaction mixture is heated to and maintained at 90°–95° C. (4 hours) until more than 95% of the monomer is consumed (glc analysis). The solution is then cooled and the catalyst is neutralized with 0.393 g. (7.86 meq) of 98% sulfuric acid. The amber solution is then filtered of suspended salts through a Celite Pad to yield a slightly viscous product (280 centipoises).

(d) Copolymer of 75 LMA/25 Monomer 1a

A 500 ml., three-necked, round-bottomed flask equipped with a mechanical stirrer, a reflux condenser, a nitrogen inlet, a thermometer and a heating mantle is charged with 15 g. of Monomer 1a, 45 g. of lauryl methacrylate (LMA), 120 g. of xylene and 0.6 g. of benzoyl peroxide initiator. The system is heated to 80° C. under a nitrogen atmosphere and held at that temperature for 5.75 hours. The clear, colorless solution polymer has a viscosity of 70 centipoises and a measured solids (150° C./1 hour) of 32.1%.

(e) Copolymer of 75 Isobutyl Methacrylate/25 Monomer 1a

A one-liter, four-necked, round-bottomed flask fitted with a mechanical stirrer, a nitrogen inlet, an addition funnel, a thermometer, and a heating mantle, is charged with 70 g. of VM&P naphtha and heated to 115° C. A solution of 174.4 g. of isobutyl methacrylate (iBMA), 58.1 g. of Monomer 1a, 3.7 g. of a 50% solution of t-butyl peroctoate in odorless mineral spirits and 18.2 g. of VM&P naphtha is prepared. A portion (15%, 38.2 g.) of this solution is charged to the flask and the temperature is maintained at 115° C. for 10 minutes. The remainder of this solution is then gradually added over 2 hours while maintaining 115° C. in the flask. After completion of this addition, 1.4 g. of 50% t-butyl peroctoate solution in 24.4 g. of VM&P naphtha is added over 30 minutes and the polymerization is held at temperature for an additional 15 minutes. The viscous (4350-centipoise) polymer solution has a measured (150° C./1 hour) solids of 45.8%.

EXAMPLE 2

Acrylate Ester of Ethylene Glycol Monodicyclopentenyl Ether (a) The acrylate ester (Monomer 2a) is prepared in the same manner as its methacrylate analog (Monomer 1a), using 396 g. (5.5 moles) of acrylic acid instead of 5.5 moles of methacrylic acid. Identity is confirmed by Nmr, Ir, and elemental analysis.

(b) The procedure of Example 1(c) is followed to produce a homo-oligomer of Monomer 2a, substituting 50 g. of Monomer 2a for the Monomer 1a used in Example 1(c). An oligomer solution of low viscosity is obtained.

(c) A copolymer of 60% Monomer 2a and 40% stearyl acrylate (SA) is obtained in solution by the procedure of Example 1(d) except that the monomers used are 36 g. Monomer 2a and 24 g. SA.

(d) By following the procedure of Example 1(e) substituting 46.5 g. of Monomer 2a, 163 g. of butyl acrylate (BA), and 23 g. of styrene (S) for the monomers used, there is obtained a solution of copolymer of about 20% Monomer 2a, 70% BA, and 10% S.

EXAMPLE 3

Methacrylate Ester of Neopentyl Glycol Monodicyclopentenyl Ether (Monomer 3b)

(a) Neopentyl glycol monodicyclopentenyl ether is prepared in the same manner as the ethylene glycol analog used in Example 1 above. The ethylene glycol is replaced by 2659 g. (16 moles) of neopentyl glycol. The product is isolated by distillation (112°–115° C./0.2 mm Hg) in 70% yield. Nmr is used to confirm the constitution of the compound.

(b) The methacrylate ester (Monomer 3b) is prepared by esterification with methacrylic acid in the manner described in Example 1. A portion of the product is distilled (b.p. 140° C./0.4 mm Hg).

Analysis: % Calculated: C, 74.96; H, 9.27; O, 15.77. % Found: C, 74.96; H, 9.27; O, 15.77.

Nmr and Ir spectra confirm the identity.

(c) A solution of a copolymer of 85% 2-ethylhexyl acrylate (2-EHA) and 15% Monomer 3b is prepared by following the general procedure of Example 1(d) using 51 g. of 2-EHA and 9 g. of Monomer 3b.

EXAMPLE 4

Acrylate Ester of Neopentyl Glycol Monodicyclopentenyl Ether (Monomer 4a)

(a) The acrylate ester (Monomer 4a) is prepared (b.p. 140° C./0.4 mm Hg) in the same manner as its methacrylate analog in Example 3, except that the methacrylic acid is replaced by a corresponding molar amount of acrylic acid. The spectra are consistent with the structure and differ from the methacrylate only in the acrylic vs methacrylic absorptions.

Analysis: % Calculated: C, 74.45; H, 9.02; O, 16.53. % Found: C, 74.68; H, 9.15; O, 16.53.

(b) A solution of a copolymer of 30% Monomer 4a, 60% hexyl acrylate (HA), and 10% ethyl acrylate (EA) is prepared by the procedure of Example 1(e) using as the monomers charged, 70 g. Monomer 4a, 140 g. HA, and 23.3 g. EA.

EXAMPLE 5

Methacrylate of 1,2-Propylene Glycol Monodicyclopentenyl Ether (Monomer 5b)

(a) The procedure of part (b) of Example 1 is repeated using 1217.4 g. (16 moles) of 1,2-propylene glycol instead of the corresponding molar amount of ethylene glycol, yielding the 1,2-propylene glycol monodicyclopentenyl ether.

(b) The procedure of part (a) of Example 1 is repeated using 1041.5 g. (5 moles) of 1,2-propylene glycol monodicyclopentenyl ether instead of 5 moles of the homologous ethylene glycol monodicyclopentenyl ether. Confirmation of the compound's constitution (Monomer 5b) is obtained by elemental analysis, Nmr, and IR spectral analysis.

(c) A solution of a homo-oligomer of Monomer 5b is obtained by following the procedure of Example 1(c) but using 6 g. of the ether product of part (a) of this Example 5 and 56 g. of Monomer 5b instead of the analogous ether and ester used in Example 1(c).

(d) A solution of a copolymer of 65% butyl acrylate and 35% Monomer 5b is obtained by following the process of Example 1(d) replacing the monomers with 35 g. BA and 21 g. Monomer 5b.

EXAMPLE 6

Methacrylate of 1,3-Butylene Glycol Monodicyclopentenyl Ether (Monomer 6b)

(a) The procedure of part (a) of Example 5 is repeated replacing the 1,2-propylene glycol with 1441.7 g. (16 moles) of 1,3-butylene glycol.

(b) The process of part (b) of Example 5 is repeated, replacing the monoether used therein with 1203.5 g. (5 moles) of the 1,3-butylene glycol monodicyclopentenyl ether obtained by the process of part (a) hereof.

(c) The methacrylate of 1,3-butylene glycol monodicyclopentenyl ether (Monomer 6b) obtained in part (b) of this Example 6 is copolymerized with 2-EHA by the procedure of Example 1(d) using as the monomers, 45 g. of 2-ethylhexyl acrylate and 15 g. Monomer 6b. The resulting product is a low viscosity solution of a copolymer of 75% 2-EHA and 25% Monomer 6b.

EXAMPLE 7

Methacrylate Ester of 1,6-Hexanediol Monodicyclopentenyl Ether (Monomer 7)

1,6-Hexanediol mono-dicyclopentenyl ether is prepared in the same manner as the ethylene glycol analog, in Example 1(b). This intermediate is purified by distillation (b.p. 147°-156° C./0.6 mm) in 63.5% yield. The corresponding methacrylate ester (Monomer 7) is prepared by estification in the usual manner. The infrared spectrum of the methacrylate product is essentially identical to that of Monomer 1a (the monomer produced by Example 1(a)).

This methacrylate (Monomer 7) is homopolymerized by the procedure of Example 1(c) and by repeating the process of Examples 1(d) and 1(e), substituting Monomer 7 for the Monomer 1a, there are obtained solutions of (1) a copolymer of about 75% LMA and 25% Monomer 7 and (2) a copolymer of 75% isobutyl methacrylate (iBMA) and 25% of Monomer 7.

EXAMPLE 8

Methacrylate Ester of Diethylene Glycol Monodicyclopentenyl Ether (Monomer 8)

In a manner similar to Example 7, the monodicyclopentenyl ether of diethylene glycol is isolated and purified by distillation (b.p. 122°-123° C./0.15 mm) in 62% yield and converted to the corresponding methacrylate ester (Monomer 8). The infrared spectrum is essentially similar to that of Monomer 1a while the nmr spectrum differed only by the added adsorption of 3.6 ppm (singlet, $CH_2$O-R).

This methacrylate (Monomer 8) is homopolymerized as in Example 1(c). Copolymers of Monomer 8 with LMA and with iBMA respectively are obtained in solutions by the procedures of Example 1(d) and 1(e) respectively, using a corresponding proportion of Monomer 8 in place of Monomer 1a.

The polymers of the ester monomers of Examples 1 through 8 are essentially linear vinyl-addition polymers which are still soluble and fusible so they retain the unsaturation in the ring and they thereby can be formulated in coating and impregnating compositions which are curable by oxidation in presence of a siccative.

EXAMPLE 9

Fumaric Acid bis(ethylene glycol monodicyclopentenyl) Ester (Monomer 9)

A one-liter, four-necked, round-bottomed flask fitted with a mechanical stirrer, a reflux condenser atop a Dean-Stark trap, a thermometer and a heating mantle, is charged with 58.6 g. (0.5 mole) of fumaric acid, 194 g. (1 mole) of ethylene glycol monodicyclopentenyl ether (Example 1(b)), 150 g. of toluene, and 5.75 g. ( 0.03 mole) of p-toluenesulfonic acid monohydrate. The mixture is heated at reflux; after 4 hours water evolution ceases and 18 g. (1 mole) of water has been collected. Toluene is stripped in vacuo and the crude product is taken up in diethyl ether. The ether solution is washed with aqueous sodium carbonate solution to quench the acid catalyst and remove any residual carboxylic acid. The ether solution is washed repeatedly with water until the wash solution becomes neutral, dried, and then stripped in vacuo.

This Monomer 9 (fumarate bis-ester) and Monomer 10 (the maleate bis-ester of Example 10 following) copolymerize with styrene in similar fashion to the simpler, analogous dialkyl fumarates and maleates respectively, e.g. the dibutyl or the di(2-ethylhexyl) esters, i.e. in approximately equimolar ratios. Like the polymers of the esters of the preceding Examples 1 through 8, the copolymers of the fumarate and maleate bis-esters (that is of Monomer 9 or of Monomer 10) retain the ring unsaturation that renders these copolymers susceptible to autoxidation. Thus, coating compositions and other types of compositions can be made from any of these linear addition polymers and films or other articles may be made from such compositions, preferably containing a siccative, and such articles can be oxidatively cured or crosslinked, or air-drying or baking in an atmosphere containing oxygen at normal room or elevated temperatures.

EXAMPLE 10

Maleic Acid bis(ethylene glycol monodicyclopentenyl) Ester (Monomer 10)

The maleate bis-ester of ethylene glycol monodicyclopentenyl ether is prepared in the same manner as the fumarate ester described in Example 9. The nmr spectrum of the maleate differed only in the position of the maleate protons which are shifted upfield to 6.25 ppm. The infrared spectrum shows no substantial difference from that of the fumarate.

EXAMPLE 11

(a) To a portion of Monomer 1a, there is added 0.06% cobalt (II) metal in the form of the naphthenate. The homogeneous solution is poured into a dish to a depth of about 10 mils. The liquid cures to a hard, yet tough film in about 24 hours at ambient temperature. No cure is observed in the absence of drier.

The monomer compounds of Formula I produced in Examples 2 through 8 inclusive as well as Monomer 9 and Monomer 10 are tested in the same way with essentially similar results.

(b) To each of separate portions of the linear addition polymers obtained in examples 1(c), 1(d), 1(e), 2(b), 2(c), 2(d), 3(c), 4(b), 5(c), 5(d), 6(c), 7, 8, and 9 from the various ester-ether monomers produced in Examples 1 through 10 inclusive, there is added 0.06% cobalt (II) metal in the form of the octoate or 0.06% manganese metal in the form of the naphthenate. On drying films at ambient temperatures, they become hard and tough.

(c) To each of separate portions of Monomer 1a and Monomer 2a there is added cobalt naphthenate (6% Co) in an amount to yield 0.06% metal on monomer. The liquids are then cast on steel test panels to yield films of 2-mil dry thickness and are allowed to cure at ambient temperature. In two days the films are dry and tack-free. After one week the films are tested for hardness, impact strength, and for extent of crosslinking via determination of fraction soluble in toluene. Samples are also evaluated for weatherability using a Xenon Arc Weather-Ometer (Model 60-WRC, Atlas). Testing results are given in Table I below. Performance of DCPMA and DCPA is included for comparison.

TABLE I

| Monomer | Hardness (KHN) | Soluble Fraction | Direct Impact (in.-lb.) | Weatherability |
|---|---|---|---|---|
| 1a | 15 | 0.13 | <2 | Slight surface frosting at 150 hours |
| 2a | 15 | 0.13 | 6 | No change at 300 hours |

TABLE I-continued

| Monomer | Hardness (KHN) | Soluble Fraction | Direct Impact (in.-lb.) | Weatherability |
|---|---|---|---|---|
| DCPMA | 24 | 0.46 | <2 | Disintegrates to powder at 75 hours. |
| DCPA | 22 | 0.30 | <2 | Disintegrates to powder at 150 hours |

The monomers of formula I (and the linear addition polymers thereof) exhibit remarkably better physical properties, degree of cure, and weathering resistance than DCP(M)A.

EXAMPLE 12

The monomers of formula I described herein serve exceptionally as reactive diluents for alkyds. In a typical formulation, the binder is a long oil alkyd (55% dehydrated castor oil, 32% o-phthalic anhydride, 17% glycerine-50% solids in mineral thinner) diluted with an equal weight (based on alkyd solids) of a monomer of one of the first 5 examples. The formulations are pigmented with rutile titanium dioxide to a pigment/binder ratio of 40/60 parts by weight. Cobalt naphthenate drier (0.2% metal by weight based on alkyd solids plus monomer) and butyraldehyde-oxime (0.5% by weight, based on the total weight of monomer and alkyd solids) are added. The resulting compositions have a solids content of about 77% by weight. The formulation without monomer also has a pigment/binder ratio of 40/60 parts by weight, and has a solids content of 56% after viscosity reduction with 20 parts of toluene. Portions of the several compositions are placed in separate air-tight containers and several weeks later opened to determine that they were still suitable for use.

Films of the compositions are cast on panels and aged one week at ambient temperatures and then tested. Table II compares modified and unmodified alkyd.

TABLE II

| Monomer Ex. | Visc.[a] (cp) | Vol. Solids (%) | Hardness KHN | Hardness Pencil | Mandrel Flexibility (Diam. Pass) | Tide[b] Bath 165° F. 100 Hr (c) |
|---|---|---|---|---|---|---|
| None | 677 | 38.3 | 2.2 | B | 1/4" | 0 |
| 1a | 241 | 62.8 | 5.3 | F | 1-1/4" | 5 |
| 2a | 240 | — | 5.3 | F | 1/4" | 5 |
| 3b | 375 | — | 4.5 | B | 1" | 6 |
| 4a | 289 | — | 3.8 | F | 1" | 6 |
| 5b | 271 | — | 5.4 | HB | 2" | 9 |

[a]Brookfield Viscosity (Spindle No. 2, 30 rpm. 25° C.)
[b]Registered Trademark, Monsanto Chemical Company
[c]Ratings on a scale of 0–10, 10 being unaffected, and 0 being a complete failure.

The data show that the use of the reactive monomers of formula I decrease the viscosity of the alkyd by a factor of 2 while simultaneously increasing the volume solids of the formulation by a factor of 2. In addition, there is a marked improvement in film hardness and resistance to hot alkali (Tide). Lastly, these monomers impart no odor to the coating.

EXAMPLE 13

High Solids Force-Dry Alkyd Coatings $TiO_2$ pigmented coatings are formulated as follows:
Paste (ground by three passes on a three-roll mill) is used in the four coating compositions of Table III.

| | Parts |
|---|---|
| Rutile $TiO_2$ | 27.8 |
| Alkyd Resin (60% solids)[1] | 21.0 |
| Total | 48.8 |

TABLE III

| Enamel | A | B | C | D |
|---|---|---|---|---|
| Paste | 48.8 | 48.8 | 48.8 | 48.8 |
| Alkyd Resin (60%)[1] | 25.2 | — | — | — |
| Varsol No. 1 | 18.9 | — | — | — |
| Solvesso 150 | 2.1 | — | — | — |
| Monomer 1a | — | — | — | 12.6 |
| DCPMA | — | 12.6 | — | — |
| DCPA | — | — | 12.6 | — |
| Cobalt Naphthenate (6% Co) | 0.09 | 0.08 | 0.08 | 0.08 |
| Methyl butyl ketone-oxime | 0.25 | 0.25 | 0.25 | 0.25 |

[1]A long oil alkyd resin (55% soya oil, 32% o-phthalic anhydride, Gardner-Holdt Z-6 viscosity at 60% solids in mineral thinner).

| Enamel Properties | A | B | C | D |
|---|---|---|---|---|
| Alkyd resin/monomer ratio | 100/0 | 50/50 | 50/50 | 50/50 |
| Pigment/binder ratio | 50/50 | 50/50 | 50/50 | 50/50 |
| Volume percent solids | 39.1 | 74.3 | 74.3 | 74.3 |
| Percent cobalt on binder solids | 0.02 | 0.02 | 0.02 | 0.02 |

Portions of the compositions are put in air-tight containers and checked for stability at two-week intervals. These are found to remain sufficiently stable for use after several months storage. Other portions of the freshly prepared enamels are filmed on tared steel test panels to yield a thickness of 2 mils when dry. After weighing, the wet coated panels are placed in forced air ovens. After cooling the panels are reweighed and the weight loss is calculated as percent of monomer lost, adjustment being made for content of non-functional volatile solvent. The monomer loss results are given in Table IV below, together with observations on the state of cure of the films.

TABLE IV

| Coating Bake | | Formulation A | B | C | D |
|---|---|---|---|---|---|
| 350° F./10 min. | % monomer loss | 0 | 98 | 92 | 76 |
| | state of cure | Tack Free | Tack Free | Tack Free | Tack Free |
| 180° F./60 min. | % monomer loss | 0 | 85 | 95 | 26 |
| | state of cure | Tacky | Tack Free | Tack Free | Tack Free |

Coatings A and D are reprepared and tested at 180° F./60 min. using 0.1% cobalt on binder solids instead of 0.02%. Coating A is still tacky. Coating D is tack-free and moreover monomer loss is further reduced, from 26% to essentially nil. DCPMA and DCPA are nearly quantitatively volatilized, even at the lower baking temperature.

EXAMPLE 14

Air Drying Unsaturated Polyester Coatings

Three high solids coatings compositions are prepared by mixing the following in the weight proportions indicated.

|  | Formulation | | |
|---|---|---|---|
|  | A | B | C |
| Polyester Resin Solution[1] | | | |
| (89% in toluene) | 28.0 | 33.7 | 39.3 |
| Monomer 1a | 25.0 | 20.0 | 15.0 |
| Cobalt Naphthenate (6% Co) | 0.5 | 0.5 | 0.5 |
| Methyl ethyl ketone-oxime | 0.8 | 0.8 | 0.8 |
| Resin solids/monomer ratio | 50/50 | 60/40 | 70/30 |

[1] A polyester of maleic anhydride/dipropylene glycol (approximately 1:1 mole ratio) of molecular weight MW = 5,550 and Mn = 1,960 by Gel Permeation Chromatography.

Portions of the several compositions are put in air-tight containers and stored. They are found to be suitable for use even after being stored for a month. Other portions of the freshly prepared compositions are coated on aluminum test panels to yield films of 1.7 mils thickness when dry and are allowed to dry at ambient. The cured coatings are hard yet flexible and have excellent resistance to gasoline attack. See Table V.

TABLE V

| Formulation | Tack-Free Time (hours) | Tukon Hardness (KHN) | Pencil Hardness As is | Pencil Hardness 15 Min. in gasoline | Mandrel Flex. Pass |
|---|---|---|---|---|---|
| A | ~50 | 12.6 | 2H | 2H | 1/8" |
| B | ~53 | 6.0 | 2H | 2H | 1/8" |
| C | ~50 | 3.3 | 2H | 2H | 1/8" |

EXAMPLE 15

Air Drying Unsaturated Polyester Coatings Having Improved Cure Speed

High solids coating compositions are prepared by mixing the following:

|  | Formulation | |
|---|---|---|
|  | A | B |
| Polyester Resin Solution of Ex. 14 | 13.5 | 13.5 |
| Monomer 2a | 8.0 | 8.0 |
| Cobalt Naphthenate (6% Co) | 0.67 | 0.67 |
| Benzoic Acid | — | 0.04 |
| Hydroxyethyl toluidine | — | 0.04 |

The freshly prepared coatings are filmed as in Example 14. Tack-free time of Formulation A is 44 hours while that of Formulation B is only 18 hours.

EXAMPLE 16

Force-Dried Unsaturated Polyester Coatings

High solids coating compositions are prepared by mixing the following:

|  | Formulation | |
|---|---|---|
|  | A | B |
| Polyester Resin Solution of Ex. 14 | 11.3 | 15.8 |
| Monomer 1a | 10.0 | 6.0 |
| Cobalt Naphthenate (6% Co) | 0.67 | 0.67 |

The freshly prepared coatings are filmed on aluminum test panels to yield film thicknesses of 1.7 mils when dried and are immediately placed in a forced draft oven at 180° F. for 30 minutes. The coatings are dry and tack-free upon removal from the oven, and have the properties shown in Table VI.

TABLE VI

| Formulation | Mandrel Flex Min.Diam.Pass | Pencil Hardness As is | Pencil Hardness 15' Gasoline | Impact (in-lb) Direct | Impact (in-lb) Reverse |
|---|---|---|---|---|---|
| A | 1/8" | 3H | 3H | 15 | 5 |
| B | 1/8" | H | H | >56 | 45 |

EXAMPLE 17

High Solids Polyester Coating Compositions

High solids coating compositions are prepared by mixing the following in the weight proportions indicated.

|  | Formulation | |
|---|---|---|
|  | A | B (control) |
| Polyester Resin of Ex. 14 | | |
| (80.4% in toluene) | 62.2 | 62.2 |
| Monomer 1a | 50.0 | 50.0 |
| Cobalt Naphthenate (6% Co) | 0.83 | 0.83 |
| Methyl Ethyl Ketone-Oxime | 0.25 | — |

The formulations are placed in air-tight containers and monitored for viscosity stability at ambient temperature with the following results:

|  | Gardner-Holdt Viscosity | | | |
|---|---|---|---|---|
|  | Initial | 1 Week | 1 Month | 3 Months |
| Formulation A | P | P | P | P |
| B (control) | P | Gel | — | — |

The freshly prepared coatings are cast on aluminum test panels to yield 1.5 mil films when dry and are force-dried at 180° F. for 30 minutes. Both coatings cure to tack-free, mar-resistant, tough films.

Similar results are obtained when the compositions of Examples 15, 16 and 19 are provided with a corresponding proportion of other volatile ketone-oximes, including 5-methyl-3-heptanone oxime, and cyclohexanone-oxime, and the compositions are stored for several months. The enamel prepared in Example 17 can also be stored in air-tight containers for a considerable length of time before use.

EXAMPLE 18

Force-Dried Pigmented Polyester Coating

A TiO$_2$ paste of the following proportions is ground by three passes on a three-roll mill:

|  | Parts |
|---|---|
| Rutile TiO$_2$ | 45.0 |
| Polyester Resin Solution of Example 14 | 19.0 |
| Xylene | 3.5 |

The paste is then formulated to yield an enamel according to the recipe:

|  | Parts |
|---|---|
| Paste | 67.5 |
| Polyester Resin Solution | |

-continued

| | Parts |
|---|---|
| of Example 14 | 18.1 |
| Monomer 1a | 22.0 |
| Xylene | 0.8 |
| Cobalt Naphthenate (6%) | 0.92 |
| Anticrater agent[1] | 0.28 |
| Methyl ethyl ketone-oxime | 0.14 |
| Polyester/Monomer 1a ratio | 60/40 |
| TiO$_2$/binder ratio | 45/55 |

[1]General Electric Silicone SF-1023 at 10% in Cellosolve acetate.

The enamel is applied to an aluminum test panel to yield a film having 1.7 mil thickness when dry and is immediately placed in a circulating-air oven at 180° F. for 30 minutes. The coating is dry and tack-free when removed from the oven, and has the following properties:

| Tukon Hardness (KHN) | 13.1 |
|---|---|
| Pencil Hardness | |
| (as is/15′ gasoline | 2H/2H |
| Direct impact | |
| (in-lb) | 10 |
| Mandrel flex | ⅛″ pass |
| Gloss (20°/60°) | 78/90 |

EXAMPLE 19

Air-Drying (Meth)acrylated Polyurethane Resin Compositions

High solids coating compositions, A, B, C, and D are prepared by mixing the following:

| | Parts (wt) in Formulations | | | |
|---|---|---|---|---|
| Material | A | B | C | D |
| Acrylated urethane resin[1] (50% in toluene) | 26.60 | 20.00 | — | — |
| Acrylated urethane resin[2] (50% in toluene) | — | — | 26.60 | 20.00 |
| Monomer 1a | 6.70 | 10.00 | 6.70 | 10.00 |
| Cobalt Naphthenate (6% Co) | 0.33 | 0.33 | 0.33 | 0.33 |
| Urethane Resin/ Monomer 1a ratio | 67/33 | 50/50 | 67/33 | 50/50 |

[1]The urethane condensate of: tolylene diisocyanate (2 moles) 2-hydroxyethyl acrylate (2 moles) and polycaprolactone diol (1 mole) in which the latter diol has a molecular weight of about 1250 (available commercially under the registered trademark NIAX PCP-0230, Union Carbide Corp.)
[2]The urethane condensate as in footnote 1 except the acrylate is replaced by 2-hydroxyethyl methacrylate.

The compositions are spread on aluminum test panels to form films having a thickness of 1.7 mils when dry. The coated panels are allowed to cure at ambient and have the properties shown in the following Table VII.

TABLE VII

| Formulation | A | B | C | D |
|---|---|---|---|---|
| Tack-Free Time (hours) | 40 | 48 | 40 | 48 |
| Tukon Hardness (KHN) | 0.44 | 0.68 | 0.35 | 0.94 |
| Pencil Hardness | | | | |
| (as is/15′ gasoline) | F/F | 2H/2H | F/F | 2H/2H |
| Mandrel Flex. (pass) | ⅛″ | ⅛″ | ⅛″ | ⅛″ |
| Impact (in-lb., reverse) | >56 | >56 | >56 | >56 |

Compositions of this type provide coatings characterized by high performance and suitable, among other uses, as a "wear layer" for flooring materials, such as of linoleum, vinyl tile, asphalt tile and the like.

EXAMPLE 20

Air Drying Uralkyd Coatings

High solid uralkyd coating compositions are prepared by mixing the following:

| | Formulation | | | |
|---|---|---|---|---|
| | A | B | C | D |
| | (control) | | | |
| Uralkyd Resin (60% in xylene[1]) | 166.7 | 125.0 | 83.3 | 83.3 |
| Monomer 1a | — | 25.0 | 50.0 | 50.0 |
| Cobalt Naphthenate (6% Co) | 1.0 | 1.0 | 1.0 | 1.0 |
| Methyl Ethyl Ketone-Oxime | 0.25 | 0.25 | 0.25 | — |
| Convertible solids content (wt. %) | 59.5 | 66.1 | 74.3 | 74.5 |
| Gardner-Holdt Viscosity (in air-tight containers) | | | | |
| Initial | X | J | C | D |
| One Week | X | J | C | gel |

[1]ASTM Type 1 Urethane Resin (no free NCO): Available as Spenkel F77-6-X, 60% solids in xylol with viscosity of S Gardner-Holdt (Spencer-Kellogg Co.)

The freshly prepared compositions are cast on steel test panels to yield 1.7 mil films when dry and are allowed to dry at ambient temperature. The coatings show the following properties upon testing.

| | Formulation | | | |
|---|---|---|---|---|
| | A | B | C | D |
| Tukon Hardness | | | | |
| 2 days | 0.45 | 0.78 | 1.40 | 2.40 |
| 1 week | 1.10 | 1.40 | 2.52 | 2.76 |
| Pencil Hardness | | | | |
| 2 days | <6B | 6B | B | B |
| 1 week | <6B | 2B | 2H | 2H |
| Zapon Tack-free Time, hours | 3.5 | 6 | 24 | 24 |
| Gardner Impact (in-lb), 1 week | | | | |
| Direct | >120 | >120 | 10 | 14 |
| Reverse | >120 | 120 | >2 | >2 |
| Gasoline Resistance, 1 week | | | | |
| 15 minute contact pencil hardness | <6B | 2B | 2H | 2H |

The formulations containing monomer 1a have excellent hardness development and gasoline resistance and are very stable when formulated with volatile oxime.

EXAMPLE 21

Gasoline Resistant Air Curing Acrylic Coatings

Additional acrylic (co)polymer resins are prepared by the general method of Example 1e, of composition and characteristics as follows:

| Resin | Composition (wt. %) | Wt. % Solids* (in VM&P Naphtha) | Viscosity (cps) |
|---|---|---|---|
| A | iBMA/DCPMA/MAA = 79.5/ 20 /0.5 | 45.8 | 4250 |
| B | iBMA/DCPA/MAA = 79.5/ 20/0.5 | 46.3 | 2500 |
| C | iBMA/Monomer 1a/MAA = 79.5/ 20/ 0.05 | 46.8 | 1940 |
| D | iBMA/Monomer 2a/MAA = | | |

-continued

| Resin | Composition (wt. %) | Wt. % Solids* (in VM&P Naphtha) | Viscosity (cps) |
|---|---|---|---|
| | 79.5/ 20/ 0.5 | 46.4 | 1176 |
| E | iBMA/MAA = | | |
| | 99.5/0.5 | 44.4 | 5190 |

*measured (150° C. 1 hour)

TiO₂ pigmented coatings are prepared from each of the resins above by the following technique:

I. Sand Mill Pigment Dispersion

The following are charged to a laboratory version of a Sherwin-Williams miniature sand mill and ground for 15 minutes:

| | | |
|---|---|---|
| Rutile TiO₂ | 100 | parts |
| Resin (solids) | 10 | adjusted according to actual solids contents of resin above |
| VM&P Naphtha | 15 | |
| Xylol/Cellosolve acetate = 3/1 | 75 | |
| 20-30 mesh Ottawa sand | 200 | |

The pigment dispersions are recovered from the sand by filtration through a fine varnish filter and thence are formulated each into two paints, with and without added Monomer 1a.

II. Formulation

| | Without Monomer 1a | With Monomer 1a |
|---|---|---|
| Pigment dispersion | 40.0 | 40.0 |
| Resin (solids) ⎫ adjusted | 27.7 | 21.7 |
| VM&P Naphtha ⎭ | 32.8 | 25.7 |
| Monomer 1a | — | 6.0 |
| Varsol No. 1 | 10.0 | — |
| Methyl Ethyl Ketone Oxime¹ | 0.3 | 0.3 |
| Cobalt Naphthenate (6% Co) | 0.3 | 0.3 |

¹(as a 25% solution in toluene)

Pigment/binder=40/60 by weight in both formulations.

Solids Content: without Monomer 1a, 45%; with Monomer 1a, 53%.

The coatings are applied to steel test panels to yield 1.5 mils when dry, and are tested after one week at ambient temperature with the results given in Table VIII.

In all cases formulation with Monomer 1a as a replacement for a portion of the acrylic resin allows solids to be increased by about 8 percent for approximately equal viscosity. More importantly formulation with Monomer 1a results in significantly higher gloss. Also significantly, the resins containing the dicyclopentenyl monomers confer a useful level of gasoline resistance; the coatings soften but are otherwise undamaged and rapidly recover their original hardness.

TABLE VIII

| Resin Used | Formulation Type | Viscosity (cps) | Tukon Hardness | Pencil Hardness As is | Pencil Hardness 15 min in gasoline | 20° Gloss |
|---|---|---|---|---|---|---|
| A | w/o Mon. 1a | 185 | 13.5 | HB | 6B | 63 |
| | w Mon. 1a | 187 | 18.4 | F | 6B | 67 |
| B | w/o Mon. 1a | 242 | 9.0 | B | 6B | 63 |

TABLE VIII-continued

| Resin Used | Formulation Type | Viscosity (cps) | Tukon Hardness | Pencil Hardness As is | Pencil Hardness 15 min in gasoline | 20° Gloss |
|---|---|---|---|---|---|---|
| | w Mon. 1a | 265 | 15.2 | F | 6B | 79 |
| C | w/o Mon. 1a | 144 | 8.7 | F | 6B | 56 |
| | w Mon. 1a | 159 | 14.8 | F | 6B | 78 |
| D | w/o Mon. 1a | 155 | 5.9 | F | 6B | 70 |
| | w Mon. 1a | 166 | 12.5 | F | 6B | 79 |
| E | w/o Mon. 1a | 200 | 8.4 | F | dissolves | 41 |
| | w Mon. 1a | 200 | 12.5 | F | dissolves | 66 |

EXAMPLE 22

Coatings Based on Polystyrene Resin

Polystyrene clear coatings of improved application solids and hardness development are prepared by mixing the following (the polystyrene resin being predissolved in the toluene).

| | Composition | | |
|---|---|---|---|
| | A (control) | B | C |
| Polystyrene resin¹ | 10.0 | 6.0 | 6.0 |
| Monomer 1a | — | 4.0 | — |
| Monomer 2a | — | — | 4.0 |
| Toluene | 10.0 | 6.0 | 6.0 |
| Cobalt naphthenate (6% Co) | — | 0.10 | 0.10 |
| Methyl ethyl ketone-oxime | — | 0.12 | 0.12 |
| Convertible solids content (wt. %) | 50.0 | 62.5 | 62.5 |
| Viscosity (centistokes, 25° C.) | 225 | <100 | <100 |

¹A clear, colorless thermoplastic polystyrene of 22,000 average molecular weight, 13-21 cps viscosity at 30% solids in toluene, and a softening range of 60-93° C. (available as Dow Resin PS-2, Dow Chemical Co.)

The freshly prepared coatings are applied to steel test panels to yield 2 mil films when dry. Hardness development of the coatings is monitored with the following results:

| | Composition | | |
|---|---|---|---|
| | A | B | C |
| | (Tukon Hardness/Pencil Hardness) | | |
| 1 Week | — | 19.6/F | 16.8/F |
| 2 Weeks | 2.3/2B | — | — |
| 3 Months | 7.9/B | — | — |

EXAMPLE 23

Coatings Based on Polyvinyl Butyral Resins

Polyvinyl butyral clear coating compositions of improved application solids are prepared by mixing the following (the polyvinyl butyral resin being predissolved in the toluene/ethanol mixture):

| | Composition | | |
|---|---|---|---|
| | A (control) | B | C |
| Polyvinyl butyral resin¹ | 4.50 | 4.50 | 4.50 |
| Toluene/ethanol (95%) 60/40 | 25.50 | 22.42 | 22.42 |
| Monomer 1a | — | 3.00 | — |
| Monomer 2a | — | — | 3.00 |
| Cobalt naphthenate | | | |

-continued

| | Composition | | |
|---|---|---|---|
| | A (control) | B | C |
| (6% Co) | — | 0.08 | 0.08 |
| Methyl ethyl ketone-oxime | — | 0.15 | 0.15 |
| Convertible solids content (wt. %) | 15 | 25 | 25 |
| Viscosity (Gardner-Holdt, 25° C.) | Z-5 | Z-5 | Z-5 |

[1] A resin of 180,000-270,000 weight average molecular weight, 17.5-21.0% hydroxyl content expressed as polyvinyl alcohol, and a butyral content of 80% expressed as polyvinyl butyral (available as Butvar ® B-72A, Monsanto).

The freshly prepared compositions are applied to steel test panels to yield 2.5 mil films when dry. After one week at ambient temperature, the coatings have the following hardness values:

| | Composition | | |
|---|---|---|---|
| | A | B | C |
| Tukon hardness | 11.6 | 12.7 | 15.3 |
| Pencil hardness | 2H | 2H | 2H |

EXAMPLE 24

Coatings Based on Polyvinyl Chloride Resin

Vinyl chloride solution coatings of improved hardness and application solids are prepared by mixing the following (the vinyl chloride resin being predissolved in the methyl isobutyl ketone):

| | Composition | | |
|---|---|---|---|
| | A (control) | B | C |
| Vinyl chloride resin[1] | 5.00 | 3.00 | 3.00 |
| Methyl isobutyl ketone | 15.00 | 9.00 | 9.00 |
| Monomer 1a | — | 2.00 | — |
| Monomer 2a | — | — | 2.00 |
| Cobalt naphthenate (6% Co) | — | 0.05 | 0.05 |
| Methyl ethyl ketone-oxime | — | 0.25 | 0.25 |
| Convertible solids content (wt. %) | 25 | 36 | 36 |
| Viscosity (centistokes, 25° C.) | 2100 | 900 | 900 |

[1] Copolymer of composition: vinyl chloride/vinyl acetate/vinyl alcohol = 91/3/6 by weight, molecular weight = 23,100, and glass transition temperature = 79° C. (available as Bakelite ® VAGH, Union Carbide)

The freshly prepared coating compositions are applied to steel test panels to yield 1.5 mil films when dry. After one week at ambient temperature the coatings have the following hardness values:

| | A | B | C |
|---|---|---|---|
| Tukon hardness | 10.4 | 17.0 | 18.2 |
| Pencil hardness | F | 2H | 3H |

EXAMPLE 25

Chlorinated Rubber Coatings

Chlorinated polyisoprene solution coatings of improved application solids are prepared by mixing the following (the resin being predissolved in toluene):

| | Composition | | | | | |
|---|---|---|---|---|---|---|
| | A | B | C | D | E | F |
| Chlorinated rubber[1] | 4.00 | 3.60 | 2.40 | 2.40 | 2.40 | 2.40 |
| Toluene | 6.00 | 4.00 | 6.00 | 4.00 | 6.00 | 4.00 |
| Monomer 1a | — | 2.40 | — | 2.40 | — | 2.40 |
| Chlorinated paraffin[2] (plasticizer) | — | — | 1.60 | 1.20 | — | — |
| Dioctyl phthalate (plasticizer) | — | — | — | — | 1.60 | 1.20 |
| Cobalt naphthenate (6% Co) | — | 0.06 | — | 0.06 | — | 0.06 |
| Methyl ethyl ketone-oxime | — | 0.1 | — | 0.1 | — | 0.1 |
| Convertible solids content (wt. %) | 40 | 60 | 40 | 60 | 40 | 60 |
| Viscosity, centistokes | 3700 | 6500 | 320 | 900 | 260 | 650 |

[1] Chlorinated rubber of 64.5% minimum fixed chlorine having a density of 1.6 g/ml, a refractive index of 1.59 (D line), and a 20% in toluene solution viscosity of about 40 cps (available as Alloprene ® X-40, ICI United States, Inc.).
[2] Chlorinated paraffin of approximately 42% chlorine content having a viscosity of approximately 25 poise at 25° C. available as Cereclor ® 42P, ICI United States, Inc.).

The compositions are applied to steel test panels to yield 1.4 mil films when dry. The following properties are observed upon testing after drying for one week at ambient temperature.

| | Composition | | | | | |
|---|---|---|---|---|---|---|
| | A | B | C | D | E* | F |
| Tukon Hardness | 14.2 | 16.9 | 1.8 | 5.0 | 0.4 | 1.0 |
| Pencil Hardness | F | 2H | B | F | 3B | 2B |
| Gardner Direct Impact (in-lb) | <2 | <2 | 15 | <2 | >45 | 30 |

*film is tacky

Thus Monomer 1a is not only compatible and curable with chlorinated rubber but also with well known plasticizers for chlorinated rubber permitting formulation of high solids coatings having a wide latitude of useful performance parameters.

EXAMPLE 26

Solventless Drying Oil Finishes

100% Solids coating compositions are prepared by mixing the following:

| | Composition | | | | | |
|---|---|---|---|---|---|---|
| | A | B | C | D | E | F |
| Linseed oil | 6.00 | 6.00 | — | — | — | — |
| Soya oil | — | — | 6.00 | 6.00 | — | — |
| Safflower oil | — | — | — | — | 6.00 | 6.00 |
| Monomer 1a | 4.00 | — | 4.00 | — | 4.00 | — |
| Monomer 2a | — | 4.00 | — | 4.00 | — | 4.00 |
| Rheology control agent[1] (thickner) | 2.00 | 2.00 | 2.00 | 2.00 | 2.00 | 2.00 |
| Cobalt naphthenate (6% Co) | 0.12 | 0.12 | 0.12 | 0.12 | 0.12 | 0.12 |
| Methyl ethyl ketone-oxime | 0.12 | 0.12 | 0.12 | 0.12 | 0.12 | 0.12 |

[1] Piccodiene ® 2215 described in Example 29.

The freshly prepared compositions are applied to steel test panels. After one week of cure at ambient temperature the following properties are observed:

|  | Composition | | | | | |
|---|---|---|---|---|---|---|
|  | A | B | C | D | E | F |
| Tukon Hardness | 1.4 | 0.8 | 0.4 | 0.7 | 0.7 | 0.7 |
| Pencil Hardness | 4B | <6B | <6B | 2B | 5B | 4B |
| Gardner Direct Impact (in-lb) | <2 | 40 | 4 | 25 | <2 | 25 |

EXAMPLE 27

Solventless Polybutadiene Coatings

One hundred percent reactive liquid coatings are prepared by mixing the following:

|  | Composition | | | |
|---|---|---|---|---|
|  | A | B | C | D |
| Polybutadiene resin 1[1] | 6.00 | 6.00 | — | — |
| Polybutadiene resin 2[2] | — | — | 6.00 | 6.00 |
| Monomer 1a | 4.00 | — | 4.00 | — |
| Monomer 2a | — | 4.00 | — | 4.00 |
| Cobalt naphthenate (6% Co) | 0.10 | 0.10 | 0.10 | 0.10 |
| Methyl ethyl ketone-oxime | 0.20 | 0.20 | 0.20 | 0.20 |

[1] Butadiene homopolymer: 60% trans-1,4, 20% cis-1,4, and 20% vinyl-1,2. Hydroxyl number is 46.6, iodine number is 398, average molecular weight is 2800, and viscosity at 25° C. is 7500 cps (available as Poly bd® Liquid Resin R-45HT, Arco Chemical Co.).
[2] Butadiene homopolymer: 40% trans-1,4, 15% cis-1,4, and 45% vinyl. Molecular weight is 2600, iodine number is 450, and viscosity at 25° C. is 6600 cps (available as Lithene® PH, Lithium Corporation of America).

The freshly prepared compositions (all of viscosity about 1000 cps) are applied to steel test panels at thickness of 2 mils. After curing for 1 week at ambient temperature the following properties are observed:

|  | Composition | | | |
|---|---|---|---|---|
|  | A | B | C | D |
| Tukon Hardness | 1.5 | 0.8 | 6.6 | 4.9 |
| Pencil Hardness | B | 2B | F | 2H |
| Gardner Reverse Impact (in-lb) | 5 | 20 | <2 | <2 |
| Gardner Direct Impact (in-lb) | — | — | 4 | 20 |

EXAMPLE 28

Solventless Butadiene Copolymer Coatings

One hundred percent reactive liquid coatings are prepared by mixing the following:

|  | Composition | | | |
|---|---|---|---|---|
|  | A | B | C | D |
| Copolymer 1[1] | 6.00 | 6.00 | — | — |
| Copolymer 2[2] | — | — | 6.00 | 6.00 |
| Monomer 1a | 4.00 | — | 4.00 | — |
| Monomer 2a | — | 4.00 | — | 4.00 |
| Cobalt naphthenate | 0.10 | 0.10 | 0.10 | 0.10 |
| methyl ethyl ketone-oxime | 0.15 | 0.15 | 0.15 | 0.15 |

[1] Copolymer 1 contains 85% butadiene and 15% acrylonitrile. The microstructure of the butadiene portion is the same as given for the homopolymer of Example 27 (Polybutadiene resin 1). Hydroxyl number is 33.7, iodine number is 345, and average molecular weight is 4500 (available as Poly bd® Liquid Resin CN-15, Arco Chemical Co.).
[2] Copolymer 2 contains 75% butadiene and 25% styrene. The microstructure of the butadiene is the same as for the homopolymer of Example 34 (Polybutadiene resin 1). Hydroxyl number is 36.5, iodine number is 335, and average molecular weight is 3400 (available as Poly bd® Liquid Resin CS-15, Arco Chemical Co.).

The freshly prepared compositions are applied to steel test panels at a thickness of 2.5 mils. After curing for 1 week at ambient temperature, the following properties are observed:

|  | Composition | | | |
|---|---|---|---|---|
|  | A | B | C | D |
| Tukon Hardness | 1.4 | 0.9 | 1.1 | 1.1 |
| Pencil Hardness | HB | F | B | F |
| Gardner Reverse Impact (in-lb) | 5 | 15 | <2 | <2 |

EXAMPLE 29

Styrene/Butadiene Copolymer Coatings

Coatings of improved application solids are prepared by mixing the following (the copolymer being predissolved in the toluene).

|  | Formulation | | |
|---|---|---|---|
|  | A (control) | B | C |
| Copolymer[1] | 30.0 | 30.0 | 30.0 |
| Toluene | 70.0 | 70.0 | 70.0 |
| Monomer 1a | — | 20.0 | — |
| Monomer 2a | — | — | 20.0 |
| Methyl ethyl ketone-oxime | — | 0.8 | 0.8 |
| Cobalt naphthenate (6% Co) | — | 0.8 | 0.8 |
| Convertible solids content (wt. %) | 30 | 42 | 42 |
| Viscosity, centistokes | 375 | 300 | 300 |

[1] A predominantly linear copolymer of monomer mole ratio styrene/butadiene = 6/1 and having a softening point of 50 ± 3° C., a specific gravity of 1.05, an index of refraction of 1.585, and a solution viscosity of 160–195 seconds (as a 33⅓% solution in xylene) in a No. 4 Ford Cup at 77° F. (available as Pliolite S-5B, Goodyear Chemical).

The freshly prepared formulations are applied to steel test panels to yield 1.5 mil films when dry. After drying for one week at ambient temperture the coatings have the following properties:

|  | Formulation | | |
|---|---|---|---|
|  | A | B | C |
| Tukon Hardness | 2.7 | 22.0 | 16.8 |
| Pencil Hardness | H | F | 2H |

EXAMPLE 30

Drying Oil Functionalized Acrylic Coating Compositions

Coating compositions of improved application solids are prepared by mixing the following:

|  | Formulation | | |
|---|---|---|---|
|  | A (control) | B | C |
| Drying oil functional acrylic resin[1] | 20.0 | 14.0 | 14.0 |
| Monomer 1a | — | 3.0 | — |
| Monomer 2a | — | — | 3.0 |
| Methyl ethyl ketone-oxime | 0.2 | 0.2 | 0.2 |
| Cobalt naphthenate (6% Co) | 0.17 | 0.17 | 0.17 |
| Convertible solids content (wt. %) | 50.0 | 58.0 | 58.0 |
| Viscosity, centistokes | 15,000 | 6,000 | 6,000 |

[1] A 50% solids solution in butyl Cellosolve of an acrylic resin of composition by weight: butyl acrylate/methyl methacrylate/A/B/acrylic acid = 30/42/15/5/8 where A is the acrylic acid ester of N-methyl-N-hydroxyethyl dehydrated castor oil amide and B is the acrylic acid ester of N-methyl-N-hydroxyethyl tung oil amide. Average molecular weight is approximately 40,000. Preparation of this type of resin is described in the aforesaid Novak and Kine copending application Serial No. 751,507 filed December 17, 1976.

The freshly prepared compositions are applied to steel test panels to yield 2 mil thick films when dry and are cured in an oven at 180° F. for one hour. Upon testing the following film properties are observed:

|  | Formulation | | |
| --- | --- | --- | --- |
|  | A (control) | B | C |
| Tukon Hardness | 0.8 | 1.4 | 1.1 |
| Pencil Hardness as is | F | F | F |
| 15 minute gasoline soak | 6B | 2B | 6B |
| Gardner Reverse Impact (in-lb) | 46 | 12 | 30 |
| Cheesecloth Print (120/F/2 psi/1 hr.) | Heavy | Moderate | Moderate |

EXAMPLE 31

Solventless Acrylated Resin Coatings

Solventless coating compositions are prepared by mixing the following:

|  | Formulation | | | |
| --- | --- | --- | --- | --- |
|  | A (control) | B | C | D |
| Resin 1[1] | 20 | 10.00 | — | — |
| Resin 2[2] | — | — | 20 | 10.00 |
| Monomer 1a | — | 9.67 | — | 9.67 |
| Cobalt naphthenate | — | 0.33 | — | 0.33 |
| Total | 20 | 20.00 | 20 | 20.00 |
| Viscosity (centistokes) | 50,000 | 615 | 90,000 | 1075 |

[1] A polyfunctional acrylate polyester oligomer with an oillike character (available as Actomer® X-80 from Union Carbide).
[2] The diacrylate ester of a liquid Bisphenol A epoxy resin (available as Epocryl® Resin DRH-370 from Shell Chemical Co.).

The compositions are filmed on steel test panels to yield 1 mil films. After two weeks at ambient temperature, the following properties are obtained:

|  | A | B | C | D |
| --- | --- | --- | --- | --- |
| Tukon Hardness (KHN) | wet | 1.8 | wet | 9.6 |
| Pencil Hardness | wet | F | wet | H |

Compositions stable for several months are obtained when 1% by weight, based on the weight of resin plus reactive monomer, of a volatile aldehyde-oxime is added. Butyraldehyde oxime may be used or a volatile ketone-oxime can be used.

We claim:

1. A coating and/or impregnating composition, adapted to be cured by autoxidation in the presence of a siccative and oxygen, comprising (a) a compound having the general formula

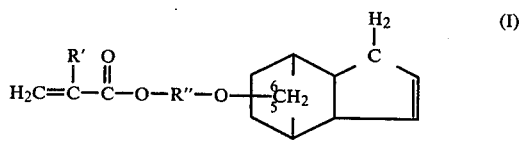

wherein
R' is H or CH$_3$ and
R" is selected from the group consisting of
(a) Alkylene groups having 2 to 6 carbon atoms and (b) Oxalkylene groups having 4 to 12 carbon atoms and having one or more oxygen atoms joining distinct segments of the alkylene chain each of at least 2 carbon atoms length extending between oxygen atoms of the alkylene group, (b) a drying oil or a film-forming addition or condensation polymer, and (c) a small but effective amount of a siccative.

2. A composition according to claim 1 wherein R" is ethylene.

3. A composition according to claim 1 wherein R" is ethylene and R' is CH$_3$.

4. A composition according to claim 1 wherein R" is ethylene and R' is H.

5. An autoxidizable composition according to claim 1 which also comprises a volatile oxime stabilizer.

6. A composition according to claim 1 wherein the film-forming condensate is a (meth)acrylate functional polyester obtained from the addition of (meth)acrylic acid across epoxy groups of epoxidized drying oils.

7. A composition according to claim 2 or claim 3 or claim 4 comprising a volatile oxime stabilizer.

8. A composition according to claim 1 in which the film-forming polymer comprising an alkyd resin of unsaturated type, and the amount of the compound of formula I is from about 5% to about 75% by weight of the total weight of alkyd resin and formula I monomer.

9. A composition according to claim 8 wherein the unsaturation of the alkyd resin is derived from the use of (1) an ethylenically unsaturated dicarboxylic acid as part or all of the polycarboxylic acid component of the alkyd resin, and/or (2) an unsaturated fatty acid or oil as a component of the alkyd resin.

10. A composition according to claim 1 wherein the film-forming polymer comprises a thermoplastic vinyl addition polymer of monoethylenically unsaturated monomers having a single unsaturated group of the formula H$_2$C=C<.

11. A composition according to claim 1 wherein the film-forming polymer is a condensation polymer modified with (meth)acrylate alpha, beta-ethylenic functionality.

12. A composition according to claim 1 wherein the film-forming polymer comprises a uralkyd having no free NCO groups.

13. A composition according to claim 1 wherein the film-forming polymer comprises a urethane oil having no free isocyanate groups.

14. A composition according to claim 1 wherein the film-forming polymer comprises an acrylated isocyanate-terminated prepolymer wherein all free isocyanate groups of the prepolymer have been reacted with a monoethylenically unsaturated monomer having an active hydrogen atom.

15. A composition according to claim 14 wherein the active hydrogen-containing monomer is hydroxyalkyl acrylate or methacrylate.

16. A composition according to claim 1 in which the film-forming polymer is a hydroxy-terminated polyether or polyester condensation polymer having a plurality of unsaturated acrylate or methacrylate groups combined with the condensation polymer.

17. A composition according to claim 1 wherein the film-forming condensate is a (meth)acrylic ester of a hydroxy-terminated polyether or a hydroxy-terminated polyester.

18. A composition according to claim 1 wherein the film-forming polymer is a vinyl addition polymer having combined therein unsaturated groups selected from allylic groups and groups having drying oil functionality thereby rendering the film-forming polymer susceptible to autoxidation.

19. A composition according to claim 1 wherein the vinyl polymer is a polymer of allyl (meth)acrylate, butadiene, allyloxyethyl (meth)acrylate, or, or a film-forming addition polymer of a compound of formula I.

20. A composition according to claim 18 wherein the vinyl polymer has, attached to the polymer chain, unsaturated groups or radicals derived from drying oils.

21. A composition according to claim 1 wherein the polymer is a thermoplastic vinyl addition polymer selected from (1) solution polymers having high molecular weights, (2) polyvinyl acetals, and (3) chlorinated rubber in which there is combined about 64–65% by weight of chlorine.

22. A composition according to claim 21 wherein the polymer is polyvinyl butyral.

23. A composition according to claim 21 wherein the polymer is polystyrene.

24. A composition according to claim 21 wherein the polymer is polyvinyl chloride.

25. A composition according to claim 21 wherein the polymer is polybutadiene.

26. A composition according to claim 21 wherein the polymer is a styrene/butadiene copolymer.

27. A composition according to claim 1 wherein the film-forming condensate is a resin-forming vic-epoxy resin having (meth)acrylic acid added across epoxy groups.

28. Cured articles, such as films, obtained by the autoxidation in the presence of oxygen of a composition according to claim 1.

* * * * *